US012778159B2

(12) United States Patent
Calmon et al.

(10) Patent No.: US 12,778,159 B2
(45) Date of Patent: Nov. 3, 2026

(54) LOW SODIUM PROTEIN ISOLATE

(71) Applicant: ROQUETTE FRERES, Lestrem (FR)

(72) Inventors: Lucile Calmon, Lille (FR); Christophe Laroche, Fougères (FR); Chandani Perera, Batavia, IL (US); Carlos Kantt, North Aurora, IL (US)

(73) Assignee: Roquette Freres, Lestrem (FR)

( * ) Notice: Subject to any disclaimer, the term of this patent is extended or adjusted under 35 U.S.C. 154(b) by 892 days.

(21) Appl. No.: 17/309,579

(22) PCT Filed: Dec. 11, 2019

(86) PCT No.: PCT/US2019/065605

§ 371 (c)(1),
(2) Date: Jun. 7, 2021

(87) PCT Pub. No.: WO2020/123585

PCT Pub. Date: Jun. 18, 2020

(65) Prior Publication Data

US 2022/0022490 A1 Jan. 27, 2022

(30) Foreign Application Priority Data

Dec. 11, 2018 (EP) .................................... 18306667

(51) Int. Cl.

| | |
|---|---|
| ***A23J 1/14*** | (2006.01) |
| ***A23J 3/14*** | (2006.01) |
| ***A23J 3/26*** | (2006.01) |
| ***A23L 33/185*** | (2016.01) |

(52) U.S. Cl.

CPC . *A23J 1/14* (2013.01); *A23J 3/14* (2013.01); *A23J 3/26* (2013.01); *A23L 33/185* (2016.08)

(58) Field of Classification Search

CPC ....... A23V 2250/548; A23V 2250/5488; A23J 3/14; A23J 3/16; A23J 3/346; A23J 1/14; A23J 3/26; A23L 33/185

See application file for complete search history.

(56) References Cited

U.S. PATENT DOCUMENTS

| | | | |
|---|---|---|---|
| 5,077,062 A | 12/1991 | Ernster | |
| 8,563,071 B2 * | 10/2013 | Schweizer | A23L 11/32 426/598 |
| 10,390,548 B2 | 8/2019 | Bourgeois et al. | |
| 2011/0038993 A1 | 2/2011 | Schweizer et al. | |
| 2016/0058031 A1 | 3/2016 | Segall et al. | |

FOREIGN PATENT DOCUMENTS

| | | | |
|---|---|---|---|
| EP | 2911524 A1 | 9/2015 | |
| WO | 2016015151 A1 | 2/2016 | |
| WO | WO-2017120597 A1 * | 7/2017 | A23C 11/10 |
| WO | 2018/011786 A1 | 1/2018 | |
| WO | 2018/087168 A1 | 5/2018 | |

OTHER PUBLICATIONS

Y.B Cheman, et al., "Acid Inactivation of Soybean Lipoxygenase With Retention of Protein Solubility", Journal of Food Science, vol. 54, No. 4, Jul. 1, 1989, pp. 963-967, p. 963, abstract; p. 963, Materials & Methods; p. 965, Trypsin Inhibitor Activity; p. 966, Protein Dispersibility Index; p. 966, conclusion; figures 1-2.

Database GNPD [Online] Mintel, anonymous, "Creamy Chocolate Flavored Vegetable Origin Protein Mix", Oct. 12, 2018, p. 1 Product Description; p. 2 Textures (Food & Drink); p. 2 Ingredients (On Pack); p. 2 Nutrition.

Lam & al., "Pea protein isolates: Structure, extraction, and functionality", 2018.

C-L Heydley et al., "Developing novel pea starches", Proceedings of the Symposium of the Industrial Biochemistry and Biotechnology Group of the Biochemical Society, 1996, pp. 77-87.

The English translation of the Chinese Office Action, mailed on Nov. 1, 2023, in related Chinese Appl. No. 201980081963X.

Y.B.Cheman et al., "Acid Inactivation of Soybean Lipoxygenase With Retention of Protein Solubility", Journal of Foodscience, vol. 54, Issue 4, pp. 963-967, Dec. 31, 1989.

Marc C Sanchez, "GRAS Notice (GRN) No. 581 Supplemental Response", Jun. 7, 2017, pp. 1-101, XP093244699.

* cited by examiner

*Primary Examiner* — Hong T Yoo

(57) ABSTRACT

The present invention pertains to a plant protein, including isolates and concentrates, preferably leguminous protein isolates, more preferably pea protein isolates characterized in that it contains less than 0.6% by dry weight of sodium on dry matter and below 1% by dry weight of calcium. The invention further relates to processes of extraction and purification of the plant proteins, including isolate and concentrate, preferably leguminous protein isolates, more preferably pea protein isolates of the invention. Finally, the invention also relates to the application of plant proteins, including isolate and concentrate, preferably leguminous protein isolates, more preferably pea protein isolates, of the invention, in the food, feed and pharmaceutical industries.

2 Claims, No Drawings

LOW SODIUM PROTEIN ISOLATE

FIELD OF THE INVENTION

The present invention pertains to a plant protein, including isolates and concentrates, preferably leguminous protein isolates, more preferably pea protein isolates characterized in that it contains less than 0.6% by dry weight of sodium on dry matter and below 1% by dry weight of calcium. The invention further relates to processes of extraction and purification of the plant proteins, including isolates and concentrates, preferably leguminous protein isolates, more preferably pea protein isolates of the invention. Finally, the invention also relates to the application of plant proteins, including isolates and concentrates, preferably leguminous protein isolates, more preferably pea protein isolates, of the invention, in the food, feed and pharmaceutical industries.

BACKGROUND OF THE INVENTION

Along with carbohydrates and lipids, proteins make up a significant part of our diet. The required amount of protein is generally said to be between 12% and 20% of our daily food intake.

The proteins consumed are generally either of animal origin, such as meats, fish, eggs and milk products, or of plant origin, including cereals, oleaginous plants and leguminous plants.

In industrialized countries, protein intake comes predominantly from proteins of animal origin.

It is important to note that many studies show that excessive consumption of proteins that are of animal origin, and significantly less plant proteins, is one cause of the increase in the rates of cancers and cardiovascular diseases.

Moreover, animal proteins have many disadvantages, both in terms of their allergenicity, in particular about proteins from milk and eggs, along with the degradation of our environment due to the intensive farming that is necessary for animal protein production.

Given this, manufacturers have gradually turned to plant proteins as an alternative to animal proteins. Indeed, it is known practice to use plant proteins to replace all or some of the animal proteins in food products.

This kind of replacement is not always easy, because the functional properties of plants proteins are different from those of animal proteins. In this case, functional properties refer to the physical or physicochemical properties that impact the sensory qualities of the food systems that have been generated during technological transformations, storage or domestic culinary preparations.

Among plant proteins, it is a well-known practice to use leguminous-plant proteins. Although milk proteins have a strong nutritional advantage, the high cost of production limits their use in large-scale food processing fields. As an alternative, leguminous-plant proteins can substitute milk proteins. Pea proteins in particular are now seen as game changing proteins in this field. Pea protein isolates are obtained from non-GMO sourced seeds, rather than soya protein isolates.

One drawback of certain plant proteins, particularly leguminous-plant proteins and pea proteins, is the fact that they may contain high level of sodium. As exemplified below in the present application, current commercial protein isolates, especially pea protein isolates, contains above 1% of sodium in its dry matter. Such sodium is introduced mainly during process of extraction, by means of sodium hydroxide employed in order to adjust pH. As explained in "Pea protein isolates: Structure, extraction, and functionality" (Lam & al., 2018), sodium hydroxide is commonly used in such type of wet protein extraction process.

Sodium is important for many important metabolic functions like nervous influx or muscles contraction. But, too much sodium in the diet can also bring deleterious effects, like cardiac or hypertension diseases. FAO recommend a maximum level of 2 g per day for an adult (see "Sodium intake for adults and children", FAO, 2012).

Some protein isolates already contains low level of sodium, obtained by replacing sodium hydroxide. For instance, EP2911524 discloses a process in which sodium hydroxide, mainly used in pea process in order to adjust pH, is replaced by calcium hydroxide. The isolate obtained has a low level of sodium but, as exemplified in the application, its functional properties, including low solubility, are completely changed. This isolate is perfectly dedicated for baking application but it won't fit with other food applications which require high solubility and gel strength.

Lam & al. 2018 clearly mention that "*Sulfate, hydrogen phosphate, ammonium, and potassium salts promote ion-water interactions, which act to disrupt the hydration layers surrounding the proteins to cause the exposure of hydrophobic moieties. Consequently, aggregation and precipitation ensue, depending on the ionic strength and level of hydrophobicity*". The man skilled in the art will clearly understand that using such salts as pH reagent may have a deep impact on protein isolate functionality, especially solubility".

Dry fractionation process can also deliver low sodium content protein, but it won't manage to deliver high protein isolate e.g. above 80% protein richness.

Thus, there is still a need for a protein isolate having a low sodium content while maintaining its good functional properties compared to a sodium-based isolate.

DESCRIPTION OF THE INVENTION

A first aspect of this invention is a plant protein, characterized in that its maximum content of sodium is below 0.6% by dry weight on dry matter, and its content of calcium is below 1% by dry weight on dry matter.

In a preferred embodiment, such plant protein isolate contains above 80% by dry weight of protein richness on dry matter.

In a more preferred embodiment, the plant protein of the invention is characterized in that its potassium content is between 0.5% and 3% by dry weight of its dry matter.

A second aspect of this invention is a process of preparing a plant protein described in the first aspect of this invention, comprising the following steps:

a) providing a plant seed containing protein;
b) milling said previous seed and obtaining a milled suspension in water;
c) extracting proteins from said milled suspension;
d) adjusting the pH between 6 and 9;
e) optionally heating at a temperature from 100° C. to 160° C. and/or pasteurizing the proteins obtained;
f) optionally drying the proteins obtained;

characterized in that potassium hydroxide is employed as pH reagent in step (d).

A third aspect of this invention is the use of plant protein, described in the first aspect of this invention in industrial field comprising food, feed, pharmaceutical and cosmetic applications.

Another aspect of the invention is the use of plant protein according to the invention in food texturation process.

Invention will be better understood in the following detailed description chapter.

DETAILED DESCRIPTION OF THE INVENTION

A first aspect of this invention is a plant protein, preferably a plant protein isolate, more preferably a leguminous protein isolate, even more preferably a pea protein isolate, characterized in that its maximum content of sodium is below 0.6% by dry weight on dry matter, preferably below 0.2%, more preferably below 0.1% by dry weight on dry matter, and its content of calcium is below 1% by dry weight on dry matter, preferably below 0.5%, more preferably below 0.25%, even more preferably below 0.1% by dry weight on dry matter.

The term "plant protein" is herein considered as all types of protein extracted from all types of plants. Plants must be understood as any of various photosynthetic, eukaryotic, multicellular organisms of the kingdom Plantae characteristically containing chloroplasts, having cell walls made of cellulose, producing embryos, and lacking the power of locomotion. Plants include trees, bushes, herbs, ferns, mosses, and certain green algae. Particularly in this application, the term plant applies to the leguminous family, which includes peas and fava bean. Others preferred types of plants are flax, oat, rice, and lentil.

The term "protein" as used in this application must be understood as referring to molecules, consisting of one or more long chains of amino-acid residues. In this application, proteins can be native to the plant or modified, including hydrolyzed proteins. These proteins can be of different concentrations, including isolates above 80% or concentrates above 50%. In this application, isolates in which the protein content is above 80% by dry weight on dry matter are particularly preferred.

The term "leguminous" as used herein must be understood as plants of the pea family (Leguminosae). These have seeds in pods, distinctive flowers, and typically root nodules. These nodules contain symbiotic bacteria that are able to fix nitrogen.

The term "pea" is herein considered in the broadest of its acceptable meanings. In particular, it includes all varieties of "smooth pea" and of "wrinkled pea", and all mutant varieties of "smooth pea" and of "Wrinkled pea». These varieties relate to the uses that are usually intended for each pea type (food for human consumption, animal feed and/or other uses). In the present application, the term "pea" includes the varieties of pea belonging to the *Pisum* genus and more particularly to the *sativum* and *aestivum* species. Said mutant varieties are in particular those known as "r mutants", "rb mutants", "rug 3 mutants", "rug 4 mutants", "rug 5 mutants" and "lam mutants" as described in the article by C-L HEYDLEY et al. entitled "Developing novel pea starches", Proceedings of the Symposium of the Industrial Biochemistry and Biotechnology Group of the Biochemical Society, 1996, pp. 77-87.

Sodium quantification is well known to the man skilled in chemistry and biochemistry field, and he will know all suitable analytical methods that allow quantifying sodium content. In the context of this present application, the use of flame absorption spectrometer is preferred.

In a preferred embodiment, such plant protein isolate contains above 80% of protein richness by dry weight on dry matter, more preferably above 85% by dry weight on dry matter.

Any reference assay method for quantifying the level of protein well known to one skilled in the art can be used. Preferably, a determination of the total nitrogen (in %/crude) is carried out and the result is multiplied by the coefficient 6.25. This well-known methodology in the field of proteins is based on the observation that proteins contain on average 16% of nitrogen.

Some protein concentrates obtained by air classification, including pea concentrates, may have low level in sodium but their protein content is far below 80% by dry weight on dry matter. This type of products is not suitable for some food applications which require high protein content.

In a more preferred embodiment, the plant protein of the invention, preferably plant protein isolate, more preferably leguminous protein isolate, even more preferably pea protein isolate, is characterized in that its potassium content is between 0.5 and 3% by dry weight of its dry matter, preferably between 1.5 and 2.5%, more preferably between 1.8 and 2.5% by dry weight on dry matter.

In a first variant, the plant protein of the invention, preferably plant protein isolate, more preferably leguminous protein isolate, even more preferably pea protein isolate, is characterized in that its maximum sodium content is preferably below 0.2%, more preferably below 0.1% by dry weight on dry matter and its potassium content is between 0.5 and 3% by dry weight of its dry matter, preferably between 1.5 and 2.5%, more preferably between 1.8 and 2.5% by dry weight on dry matter.

In a second variant, the plant protein of the invention, preferably plant protein isolate, more preferably leguminous protein isolate, even more preferably pea protein isolate, is characterized in that its sodium content is comprised between 0.3% and 0.6%, preferably comprised between 0.4% and 0.6%, more preferably 0.5%, by dry weight on dry matter, and its potassium content is between 0.5 and 3% by dry weight of its dry matter, preferably between 1 and 2%, more preferably between 1.3 and 1.5% by dry weight on dry matter.

Use of potassium hydroxide in total or partial replacement of sodium hydroxide in the protein extraction process allows to get a protein which is rich in potassium and poor in sodium. Especially in the pea process, man skilled in the art would avoid the use of potassium hydroxide as pH reagent to adjust the pH as it is known to have a direct modification of the solubility of pea isolate obtained. Lam & al. 2018 clearly mention that "*Sulfate, hydrogen phosphate, ammonium, and potassium salts promote ion-water interactions, which act to disrupt the hydration layers surrounding the proteins to cause the exposure of hydrophobic moieties. Consequently, aggregation and precipitation ensue, depending on the ionic strength and level of hydrophobicity*". Surprisingly, it has been discovered by the applicant that the use of potassium hydroxide to adjust the pH allows to reach a pea protein isolate that possess the same solubility as that of a protein isolate for which sodium hydroxide has been used to adjust the pH.

Such protein isolates allow also to be extruded, with good fiber forming and water retention. Other low sodium protein isolates, like calcium based isolates, leads to poor fiber forming and water retention.

A second aspect of this invention is a process of preparing a plant protein, preferably a plant protein isolate, more preferably a leguminous protein isolate, even more preferably a pea protein isolate, described in the first aspect of this invention, comprising the following steps:

a) providing a plant seed containing protein, preferably leguminous seed, more preferably pea seed;

b) milling said previous seed and obtaining a milled suspension in water;
c) extracting proteins from said milled suspension, preferably by thermocoagulation at isoelectric pH;
d) adjusting the pH between 6 and 9, preferably 7;
e) optionally heating at a temperature from 100° C. to 160° C. and/or pasteurizing the proteins obtained;
f) optionally drying the proteins obtained;

characterized in that potassium hydroxide is employed as pH reagent in step (d), preferably in total absence of sodium hydroxide.

In step (a), plant seeds suitable for this invention can be chosen from a list of food-compatible plant seeds, particularly pea, fava bean, oat, lentil, and flax. Leguminous plants are preferred. Pea seed is indeed the best and most suitable seed, followed closely by fava bean. Seeds can be cleaned, sorted, and/or toasted, blanched before being used in step (b)

Step (b) consists in milling the seed into flour, which can be done by any process known by those skilled in the art. It can include previous soaking, blanching or even the well-known roasting step, which is used to inhibit endogenous enzymes like lipoxygenases. The seed can be milled into flour before being mixed into water, a process known as "dry milling".

However, milling can also be done while seeds are suspended in water, also known as the "wet milling" process.

Step (c) consists in extracting proteins from milled seeds. The wet extraction process is particularly suitable for this invention. The aqueous flour suspension is advantageously processed in order to separate internal fibers and starch, preferably with the help of a combination of centrifugal decanter and hydrocyclones. This allows removing the pea fiber fraction and starch in a dry fraction, leaving other compounds including proteins in a wet fraction.

Extraction is advantageously done in presence of water. In the case of wet milling, water is introduced before milling. In the process of dry milling, flour is introduced with water at a concentration of 20 to 30% by dry weight, preferably at 25% by dry weight. When suspending the flour in water, it is most advantageous to choose flour with a mean particle size that is equal to or less than 100 μm. The pH of the solution is not a limiting factor, but it is most advantageous not to correct the pH of the suspension, which means working in a pH range between 6.2 and 7.

Proteins may then be isolated easily from the wet fraction by precipitation at their isoelectric pH, which is around 4.5 for pea proteins. pH is advantageously adjusted between 4 and 5, preferably 4.5. Use of mineral acid is preferred, use of chlorohydric acid is best preferred. A preferred way is to use combined isoelectric pH and heat coagulation of proteins called "thermocoagulation". In that case, temperature is advantageously chosen in a range from 50° C. to 90° C., including 55° C., 60° C., 65° C., 70° C., 75° C., 80° C. and 85° C. 70° C. is preferred. Contact time at such temperature will vary from is to 20 min, depending on temperature. The aim is here to coagulate the globulin fraction in order to separate it from other more soluble compounds. After coagulation, globulin proteins are advantageously removed from remaining soluble compounds by any known method, including centrifugation and filtration.

Step (d) consists in adjusting the pH between 6 and 9, preferably around 7 at neutral level, considering that it has been acidified in previous step. In a first embodiment, step (d) of the process of the invention is performed in total absence of sodium hydroxide. Pure potassium hydroxide is then advantageously used in total replacement of sodium hydroxide. Preferred concentration of potassium hydroxide varies from 0.5 to 2 M, preferably about 1 M. Before adjusting the pH, water may be added to the globulin fraction in order to reach a dry matter content comprised between 30% and 10%, preferably about 20% by dry weight on dry matter.

In an alternative embodiment, a mixture of potassium and sodium hydroxide can be used to adjust the pH. For this embodiment, the molar ratio between sodium hydroxide and potassium hydroxide can range from 10/90 to 90/10, preferably from 20/80 to 40/60, more preferably from 30/70 to 40/60, even more preferably the molar ratio between sodium hydroxide and potassium hydroxide is 35/65, depending on the level of sodium and potassium is desired in the final protein product. The mixture of potassium hydroxide and sodium hydroxide may be done either by mixing potassium hydroxide and sodium hydroxide together before the pH rectification, or by using potassium hydroxide and sodium hydroxide concomitantly during the pH rectification. Finally, another possible option is to mix the protein isolate obtained with potassium hydroxide and sodium hydroxide.

The process of the invention then optionally includes a step (e) of heating at a temperature from 100° C. to 160° C. and/or pasteurizing the proteins obtained after the step (d). This heating step may be performed by using any method known by the man skilled in the art such as, for example, a HTST treatment consisting in dispersing the proteins in steam water at a temperature between 100° C. to 160° C. during 0.1 s to 1 s.

The process of the invention then optionally includes a step (f) of drying the proteins obtained in order to stabilize them, preferably with the help of a spray-drier, more preferably a is multistage spray-drier. An optional homogenization of the protein obtained with a shear pump and also common known process like pasteurization or the introduction of food-grade auxiliary compounds can be done before drying.

A third aspect of this invention is the use of plant protein, preferably plant protein isolate, more preferably leguminous protein isolate, even more preferably pea protein isolate, described in the first aspect of this invention in industrial field comprising food, feed, pharmaceutical and cosmetic applications.

In particular, protein isolate from the invention can be used in food texturation process, preferably by a food extrusion process, more preferably by dry extrusion process.

Food extrusion is a form of extrusion used in food processing. It is a process by which a set of mixed ingredients are forced through an opening in a perforated plate or die with a design specific to the food, and is then cut to a specified size by blades. By such extrusion process, protein isolate can be transformed to Textured Vegetable Protein (TVP) which can be used in the meat analog or baking industries.

Plant protein isolate of the invention makes it possible to obtain TVP which possess good properties, in particular fibration level and water retention, with low sodium content. Use of low sodium protein from prior art like protein concentrates or calcium-based protein isolates lead to respectively low content protein and low fibration TVP.

The invention thus further relates to a method of food texturation, preferably a method of food extrusion, more preferably a method of dry extrusion, comprising a step of feeding an extrusion apparatus with a plant protein, preferably a plant protein isolate, more preferably a leguminous protein isolate, even more preferably a pea protein isolate according to the invention, optionally with a plant fiber, preferably a leguminous fiber, more preferably a pea fiber.

The invention will be now better understood with the following examples.

EXAMPLES

Example 1: Pea Protein Isolate Obtained with the Process of the State-of-the-Art Dry de-hulled and sorted yellow peas were first grinded into flour. Flour obtained was then mixed with distilled water with a ratio of 1:4 (w/v) of pea flour to water. Flour suspension was then centrifuged at 3,000 g for 15 minutes in order to remove starch and internal fiber, allowing a protein solution to be obtained. The protein solution was then precipitated by adjusting the pH to 4.5 with 30% HCl and heat at 70° C. during 15 min, in order to coagulate proteins. The coagulated solution is then centrifuged at 3,000 g for 15 minutes in order to recover the protein curd. The protein curd was re-suspended in distilled water in order to obtain a 20% by dry weight on dry matter content approx. and neutralized to a pH of 7.0 with 1M NaOH. The protein obtained was finally treated by a HTST (115° C., 1 s) and spray-dried in order to reach 95% by dry weight on dry matter. The sample "Prior art—Sodium" was obtained.

Example 2: Pea Protein Isolate Obtained with the Process of the State-of-the-Art Dry de-hulled and sorted yellow peas were first grinded into flour. Flour obtained was then mixed with distilled water with a ratio of 1:4 (w/v) of pea flour to water. Flour suspension was then centrifuged at 3,000 g for 15 minutes in order to remove starch and internal fiber, allowing a protein solution to be obtained. The protein solution was then precipitated by adjusting the pH to 4.5 with 30% HCl and heat at 70° C. during 15 min, in order to coagulate proteins. The coagulated solution is then centrifuged at 3,000 g for 15 minutes in order to recover the protein curd. The protein curd was re-suspended in distilled water in order to obtain a 20% by dry weight on dry matter content approximately and neutralized to a pH of 7.0 with 1M $Ca(OH)_2$. The protein obtained was finally treated by a HTST (115° C., 1 s) and spray-dried in order to reach 95% by dry weight on dry matter. The sample "Prior art—Calcium" was obtained.

Example 3: Pea Protein Isolate Obtained with the Process of the Invention

Dry de-hulled and sorted yellow peas were first grinded into flour. Flour obtained was then mixed with distilled water with a ratio of 1:4 (w/v) of pea flour to water. Flour suspension was then centrifuged at 3,000 g for 15 minutes in order to remove starch and internal fiber, allowing a protein solution to be obtained. The protein solution was then precipitated by adjusting the pH to 4.5 with 30% HCl and heat at 70° C. during 15 min, in order to coagulate proteins. The coagulated solution is then centrifuged at 3,000 g for 15 minutes in order to recover the protein curd. The protein curd was re-suspended in distilled water in order to obtain a 20% by dry weight on dry matter content approx. and neutralized to a pH of 7.0 with 1M KOH. The protein obtained was finally treated by a HTST (115° C., 1 s) and spray-dried in order to reach 95% by dry weight on dry matter. The sample "Invention—Potassium" was obtained.

Example 4: Pea Protein Isolate Obtained with the Process of the Invention

Dry de-hulled and sorted yellow peas were first grinded into flour. Flour obtained was then mixed with distilled water with a ratio of 1:4 (w/v) of pea flour to water. Flour suspension was then centrifuged at 3,000 g for 15 minutes in order to remove starch and internal fiber, allowing a protein solution to be obtained. The protein solution was then precipitated by adjusting the pH to 4.5 with 30% HCl and heat at 70° C. during 15 min, in order to coagulate proteins. The coagulated solution is then centrifuged at 3,000 g for 15 minutes in order to recover the protein curd. The protein curd was re-suspended in distilled water in order to obtain a 20% by dry weight on dry matter content approx. and neutralized to a pH of 7.0 with a 1M blend of KOH and NaOH, in a respective mass ratio of 65/35. The protein obtained was finally treated by a HTST (115° C., 1 s) and spray-dried in order to reach 95% by dry weight on dry matter. The sample "Invention—Blend Sodium Potassium" was obtained.

Example 5: Analysis of Different Protein Isolates Obtained in Examples 1 to 4

All protein isolates obtained in examples 1 to 3 were analyzed with help of following protocols:

- Dry matter was measured by desiccation with help of a balance and an oven
- Protein was quantified by assaying total nitrogen level and multiplying it by 6.25
- Sodium and Potassium contents were quantified with the help of flame ionization spectrometer
- Water and oil retention were
  - Placing 10 g (=P1) of protein and 10 g of oil or water in a 50 mL beaker
  - Let 5 h under stirring
  - Centrifugation 10 min 10000 G and discard supernatant
  - Weigh pellet (=P2)
  - Water/Oil retention=((P2−P1)/P1)*100
- Emulsifying capacity
  - introduction of 0.2 g of protein sample in 20 mL of water,
  - homogenization with the help of Ultraturax IKA T25 during 30 sec at 9500 rpm,
  - addition of 20 mL of corn oil under homogenization in same conditions as in previous step above,
  - centrifugation during 5 minutes at 3100 g.
    - a. in case of good emulsion (no break or inversion in the emulsion), a new experiment is performed after raising quantity of water and oil of 50%.
    - b. in case of bad emulsion (break or inversion in the emulsion), a new experiment is performed after lowering quantity of water and oil of 50%.
  - the maximum oil quantity (called Qmax, in mL) which can be emulsified is so determined iteratively.
  - Emulsifying capacity=(Qmax/0.2)*100 Foaming Stability/Capacity
- Solubility
  - 2.0 g sample and 100 g of distilled water are placed in a 400 mL beaker at 20° C.
  - pH is adjusted with 1N HCl and/or 1N NaOH and the mixture is made up to exactly 200.0 g with distilled water.
  - This mixture is stirred for 30 minutes and then centrifuged for 15 minutes at 3000 g.
  - After centrifugation, exactly 25.0 g of supernatant are withdrawn into a crystallizing dish (m1). The dish is placed in an oven at 103° C. until it reaches a constant mass (m2).
  - Solubility=((m2−m1)/25)*100

| | | Invention - Potassium | Invention - Blend Potassium Sodium | Prior art - Calcium | Prior art - Sodium |
|---|---|---|---|---|---|
| Dry matter | % | 94 | 93 | 93 | 94 |
| Protein | % DM | 85.9 | 86.0 | 84.3 | 85.2 |
| Sodium | % DM | 0.09 | 0.4 | 0.10 | 1.25 |
| Potassium | % DM | 1.97 | 1.4 | 0.07 | 0.06 |
| Calcium | % DM | 0.07 | 0.06 | 1.45 | 0.05 |
| Water rentention | g/g | 5.4 | 5.5 | 2.3-2.9 | 5.4 |
| Oil rentention | g/g | 2.6 | 2.4 | 2.3-2.8 | 2.2 |
| Emulsifying capacity | ml of oil/g | 600 | 650 | <50 | 650 |
| Foaming stability | % | −73 | −70 | −87 | −66.7 |
| Foaming capacity | % | 100 | 100 | 100 | 100 |
| Solubility (pH 8) | g/100 g brut | 51.4 | 51.5 | 13 | 59.7 |
| Solubility (pH 7) | g/100 g brut | 33 | 41.4 | 12 | 49 |
| Solubility (pH 6) | g/100 g brut | 18 | 19.1 | 9.8 | 23.1 |
| Solubility (pH 5) | g/100 g brut | 10.7 | 11.1 | 11.6 | 11.6 |
| Solubility (pH 4) | g/100 g brut | 15 | 15 | 14.5 | 14.9 |
| Solubility (pH 3) | g/100 g brut | 53 | 52.4 | 20.3 | 61.4 |
| pH | | 7.6 | 7.4 | 6.9 | 7.5 |

Results show that the protein of the invention have the same functional properties as sodium-based proteins of the prior art, especially solubility, which is quite unexpected.

Following table gives an overview of most common pea protein isolates from the competition:

| | | NUTRALYS S85F ROQUETTE | NUTRALYS F85M ROQUETTE | NUTRALYS BF ROQUETTE | PEA PROTEIN ISOLATE SHANDONG JIANYUAN | PISANE C9 COSUCRA | PISANE F9 COSUCRA | PISANE B9 COSUCRA |
|---|---|---|---|---|---|---|---|---|
| Dry matter | % | 7.7 | 6.8 | 7.7 | 5.8 | 7.8 | 5.0 | 3.9 |
| Protein (N 6.25) | % dm | 85.6 | 85.2 | 86.6 | 83.3 | 83.6 | 91.1 | 85.4 |
| Potassium | % dm | 0.32 | 0.29 | 0.35 | 0.23 | 0.29 | 0.22 | 0.17 |
| Sodium | % dm | 1.25 | 1.32 | 0.15 | 0.78 | 1.80 | 0.97 | 1.00 |
| Calcium | % dm | 0.06 | 0.07 | 1.40 | 0.65 | 0.04 | 0.06 | 0.05 |
| Solubility pH 3 | % | 37.8 | 36.1 | 20.3 | 19.6 | 22.3 | 20.1 | 10.6 |
| Solubility pH 4 | % | 13.9 | 13.3 | 14.5 | 12.4 | 14.9 | 11.4 | 7.6 |
| Solubility pH 5 | % | 10.8 | 10.6 | 11.6 | 10.4 | 12.5 | 9.7 | 7.2 |
| Solubility pH 6 | % | 28.2 | 23.2 | 9.8 | 10.0 | 20.4 | 14.0 | 10.4 |
| Solubility pH 7 | % | 61.8 | 37.0 | 11.5 | 13.9 | 26.5 | 21.6 | 14.6 |
| Solubility pH 8 | % | 75.2 | 52.0 | 13.0 | 16.1 | 29.1 | 24.9 | 19.0 |

| | | PISANE B9 COSUCRA | PISANE M9 COSUCRA | PROPULSE NUTRI-PEA | PURIS PEA PROTEIN 870 CTH PURIS | PURIS PEA PROTEIN 870H PURIS | PURIS PEA PROTEIN 870 PURIS | PEA PROTEIN 80% YANTAI ORIENTAL |
|---|---|---|---|---|---|---|---|---|
| Dry matter | % | 3.9 | 7.4 | 5.9 | 4.0 | 4.3 | 4.6 | 7.2 |
| Protein (N 6.25) | % dm | 85.4 | 84.6 | 82.3 | 83.2 | 85.2 | 80.7 | 83.2 |
| Potassium | % dm | 0.17 | 0.23 | 0.38 | 0.40 | 0.30 | 0.52 | 0.32 |
| Sodium | % dm | 1.00 | 1.78 | 0.85 | 0.57 | 0.80 | 0.91 | 1.08 |
| Calcium | % dm | 0.05 | 0.05 | 0.24 | 0.30 | 0.45 | 0.41 | 0.08 |
| Solubility pH 3 | % | 10.6 | 21.9 | 18.3 | 37.5 | 33.0 | 24.0 | 15.7 |
| Solubility pH 4 | % | 7.6 | 13.0 | 13.5 | 28.0 | 22.8 | 14.8 | 12.7 |
| Solubility pH 5 | % | 7.2 | 11.8 | 11.9 | 27.1 | 21.9 | 14.5 | 11.4 |
| Solubility pH 6 | % | 10.4 | 21.1 | 15.2 | 41.2 | 29.4 | 15.7 | 14.2 |
| Solubility pH 7 | % | 14.6 | 29.3 | 18.1 | 43.7 | 34.3 | 25.5 | 15.5 |

-continued

| | | | | | | | | |
|---|---|---|---|---|---|---|---|---|
| Solubility pH 8 | % | 19.0 | 33.8 | 20.8 | 47.5 | 36.9 | 34.8 | 16.9 |

Any man skilled in the art will see that the isolate of the invention has a very unique salt profile in comparison to most common commercially available isolates.

Example 6: Use of Protein Isolates Obtained in Examples 1 to 4 in Dry Extrusion Process A mixture of 87% in weight of protein isolates obtained in examples 1 to 4 and 13% in weight of pea fiber (150M from ROQUETTE) with respect to the total weight of the mixture is fed in a Leistritz/ZSE 27MAXX-60D twin-screw extrusion apparatus.

Twin-screw extrusion apparatus is run aiming to provide good fibration formation in texturized proteins. The average running conditions are:

40 kg/h dry mix and 6.65 kg/h water 1150 tr/min-specific energy 240 kW/kg

Two analyses are done:

Observation of quality of fiber forming (visual)

Water retention analysis without shredding

Place approximately 10 g of texturized protein in a beaker (weight=m1)

Add 100 mL of distilled water and wait 20 min

Eliminate residual water by centrifugation 3000 g 15 min weigh remaining hydrated texturized protein Water retention=(m2−m1)/m1

Water retention analysis with shredding

Place approximately 10 g of texturized protein in a beaker (weight=m1)

Add 100 mL of distilled water and wait 20 min

Eliminate residual water by centrifugation 3000 g 15 min

Shred remaining hydrated texturized protein with a Kenwood mixer, 2 min full speed Add 100 mL of distilled water and wait 20 min Eliminate residual water by centrifugation 3000 g 15 min weigh remaining hydrated texturized protein Water retention=(m2−m1)/m1

| | Invention - Potassium | Prior art - Calcium | Prior art - Sodium |
|---|---|---|---|
| Water retention without shredding | 2.9 | 1.2 | 3.2 |
| Water retention with shredding | 4.7 | 1.9 | 4.8 |
| Fiber formation | +++ | −−− | +++ |

Man skilled in the art will immediately learn that our invention will be a good alternative in order to produce low sodium content texturized protein.

Fibers formation is very comparable between "Invention—potassium", "Invention—blend Sodium Potassium" and "Prior art—sodium". "Prior art Calcium" doesn't provide good texturation. Despite some trials (modifications of water input, twin-screw speed modifications, . . . ), we were unable to reach fibration in the texturized proteins.

Water retention without shredding is slightly lower than sodium-rich reference: this may allow food producer to use it in food applications where water retention without shredding needs to be lower.

"Invention—Blend Sodium Potassium" allows to produce a texturized protein that is more close to the "Prior art—Sodium", especially the bulk density which is slightly lower with "Invention—Potassium".

Example 7

This example aims to compare two embodiments of the present invention described in examples 3 and 4, respectively "Invention—Potassium" and "Invention—Blend Sodium Potassium", when used in dry protein texturation. This was done in comparison with "Prior art—Full sodium" from example 1.

A mixture of 87% in weight of protein isolates obtained in examples 1, 3 and 4 and 13% in weight of pea fiber (150M from ROQUETTE) with respect to the total weight of the mixture is fed in a Coperion ZSK-25 twin-screw extrusion apparatus with 9 zones. Zone 1 and 2 consisted of conveying elements, zone 3 consisted of mixing elements, zone 4-5 consisted of conveying elements, zone 6-7 consisted of mixing elements and finally zone 8-9 consisted of conveying elements, Twin-screw extrusion apparatus is run aiming to provide good fibration formation in texturized proteins. The average running conditions are: Dry Feed rate 22 kg/hr and water 6.6 kg/hr Screw speed—1100 and specific mechanical energy 560-595 Kw·h/kg Three analyses are done on protein texturates obtained:

Observation of quality of fiber forming (visual)

Bulk density of texturized protein

A 1000 mL graduated cylinder is weighed empty (weight=m1)

The graduated cylinder is filled with texturized protein

Weight of cylinder is recorded (weight=m2)

Bulk density=m2−m1 (expressed in g/L).

Water retention analysis without shredding

Place approximately 10 g of texturized protein in a beaker (weight=m1)

Add 100 mL of distilled water and wait 20 min

Eliminate residual water by centrifugation 3000 g 15 min weigh remaining hydrated texturized protein Water retention=(m2−m1)/m1

Water retention analysis with shredding

Place approximately 10 g of texturized protein in a beaker (weight=m1)

Add 100 mL of distilled water and wait 20 min

Eliminate residual water by centrifugation 3000 g 15 min

Shred remaining hydrated texturized protein with a Kenwood mixer, 2 min full speed Add 100 mL of distilled water and wait 20 min Eliminate residual water by centrifugation 3000 g 15 min weigh remaining hydrated texturized protein Water retention=(m2−m1)/m1

| | Invention - Potassium | Invention - Blend Sodium Potassium | Prior art - Sodium |
|---|---|---|---|
| Bulk density | 64.2 | 79.7 | 81.8 |
| Water retention without shredding | 5.6 | 5.2 | 5.6 |
| Water retention with shredding | 6.3 | 6.3 | 6.4 |
| Fiber formation | +++ | +++ | +++ |

Man skilled in the art will see with these results that both isolates made following the invention delivers a textured protein that possess a good fiber formation and a good water retention.

"Invention—full Potassium" delivers a textured protein that is significantly lower in terms of bulk density versus "Prior art—sodium" (around 20%). This makes this product perfect for applications like snacks, where aerated textured products are seeked.

"Invention Blend Sodium Potassium" delivers a textured protein that is very close in terms of bulk density versus "Prior art—sodium". This makes this product perfect for applications like meat analog.

The invention claimed is:

1. A pea protein isolate having the ability to be used in a food extrusion process, comprising a content of sodium in a range from 0.3% to 0.6% by dry weight on dry matter, a content of calcium below 1% 0.25% by dry weight on dry matter, and its a potassium content in a range from 1 to 2% by dry weight on dry matter; wherein the protein content is above 80% by dry weight on dry matter.

2. The protein isolate, as recited in claim 1, wherein the sodium content is from 0.4% to 0.6% by dry weight on dry matter.

* * * * *